United States Patent [19]
Ditter, Jr.

[11] Patent Number: 5,321,803
[45] Date of Patent: Jun. 14, 1994

[54] METHOD OF MANAGING EXPRESSION DATA TO CONTROL THE PRESENTATION OF VISUAL DISPLAYS

[75] Inventor: Donald J. Ditter, Jr., Phoenix, Ariz.

[73] Assignee: Broderbund Software, Inc., Novato, Calif.

[21] Appl. No.: 662,713

[22] Filed: Mar. 1, 1991

[51] Int. Cl.⁵ .............................................. G06F 15/20
[52] U.S. Cl. ...................................... 395/161; 395/155
[58] Field of Search ................ 395/155, 161, 145, 148, 395/159, 153; 340/734, 747, 750; 364/200 MS, 900 MS

[56] References Cited

U.S. PATENT DOCUMENTS

| | | | |
|---|---|---|---|
| 5,191,646 | 3/1993 | Naito et al. | 395/161 |
| 5,235,679 | 8/1993 | Yoshizawa et al. | 395/156 |
| 5,247,611 | 9/1993 | Norden-Paul et al. | 395/161 |

Primary Examiner—Phu K. Nguyen
Attorney, Agent, or Firm—Jordan M. Meschkow; Don J. Flickinger; Lowell W. Gresham

[57] ABSTRACT

A method of operating a computer causes information to be presented through visual displays using alternate mode of expression. The method is practiced by application software which operates on a general purpose computer. The application software separates concept data from expression data. Concept data identify information which the software intends to present in a visual display, without specifying any particular one of a plurality of forms of expression that might be used to express the concept data. Expression data cause the visual display to form images in accordance with a specific mode of expression. A user specifies the expression modes to utilize while operating the application program. For example, linguistic information may be presented in English, Spanish, German, French, or other languages, and graphic information may be presented in color or in black and white. Expression tables which translate concept data into expression data are loaded into primary storage. The user may change an expression mode while the application software is executing. To change an expression mode, new expression data tables are overlaid over old expression data tables without altering the executable program, concept data tables, or other permanent data.

23 Claims, 8 Drawing Sheets

METHOD OF MANAGING EXPRESSION DATA TO CONTROL THE PRESENTATION OF VISUAL DISPLAYS

TECHNICAL FIELD OF THE INVENTION

The present invention relates generally to methods of operating general purpose computers. More specifically, the present invention relates to a method for efficiently operating and controlling a video display so that given information may be presented using alternate modes of expression.

BACKGROUND OF THE INVENTION

The presentation of information on a computer's video display terminal is an extremely important function for many computer programs which are prepared for mass markets. Such information must be quickly and easily understood by a computer user for the computer program to be truly useful. Early computer programs almost exclusively presented information by displaying only text data at video display terminals. In recent years, increasing use is being made of graphic objects, often mixed with text data, to improve the presentation of information on a computer's video display terminal. However, further improvements are needed.

Conventional methods of operating computers and video display terminals severely limit flexibility in expressing concepts. Thus, the presentation of information is typically optimized for only one application, and nothing allows easy alteration of the way information is expressed at the video display terminal so that information is presented in a most desirable form for other applications.

To be specific, conventional computer programs which control a color graphics video display terminal are often optimized to take advantage of color. However, when color graphic visual displays are printed at a printer or plotter which only prints in black and white, the results are less than optimum. For example, a visual effect which results from using color is not necessarily duplicated merely by mechanically transforming diverse colors into diverse black and white crosshatching patterns. Moreover, various graphic objects and characters which are easily visible when presented using diverse colors become difficult to discern when simply translated to black and white. While some conventional computer programs permit a black and white view of a color graphics image, such programs do not actually alter graphic characters or objects to take full advantage of the black and white medium. Moreover, such conventional programs then do not permit interactive alteration of that image to permit a user to improve the composition of the image.

In addition, conventional computer programs are often optimized to present linguistic or textual information in accordance with a single particular language, such as English, Spanish, French, German, and the like. With this approach, separate versions of the programs must be manufactured, inventoried, purchased, and used for each language. This leads to difficulties in maintaining control over the computer programs and to increased costs.

Of course, those skilled in the art will immediately recognize that the computer program may be configured so that it consists of what amounts to multiple programs. Separate ones of these programs may then accommodate black and white graphics, color graphics, English text, Spanish text, German text, French text, and the like. However, this presents an impractical solution to the problem because it duplicates numerous programming features and requires that an extremely large portion of memory be dedicated to the task of expressing concepts for visual display. In computers with limited memory capacities, this leaves less memory for performing the basic functions for which the computer program is designed. In addition, this increases the amount of disk or secondary storage space required to hold the entire computer program. It is highly desirable to minimize the number of disks which are required to hold a program because an increased number of disks increases costs while decreasing reliability and making installation more difficult.

Overlaying represents a known method for increasing the apparent size of primary storage. This method keeps only the portions of a program that are currently being accessed within primary storage, with the rest being kept on a secondary storage device until needed. However, this does nothing to solve the problem of increased secondary storage needs. Moreover, overlaying typically involves programming instructions. Thus, the programming instructions that are being kept on secondary storage are not immediately available for execution in primary storage. Consequently, computer operations are slowed down because programming instructions must be swapped between primary and secondary storage.

SUMMARY OF THE INVENTION

Accordingly, it is an advantage of the present invention that an improved method of operating a computer's video display terminal is provided.

Another advantage of the present invention is that an improved method of presenting information to a computer user is provided.

Another advantage of the present invention is that an improved method of visibly expressing concepts at a video display terminal using alternate modes of expression is provided.

Yet another advantage is that the present invention provides an improved method of conserving a computer's primary and secondary storage space while allowing flexibility in the presentation of information at the computer's video display terminal.

Still another advantage is that the present invention provides an improved method of allowing a user to quickly change concept expression modes while executing a computer program.

Another advantage of the present invention is that an improved method of operating a computer to compose a graphic visual display for printing is provided.

Yet another advantage is that the present invention provides an improved method of operating a computer in a multilingual environment.

Still another advantage of the present invention is that the present invention provides an improved method of integrating geographic information with a computer.

The above and other advantages of the present invention and the description and claims presented below may be best understood by referring to the APPENDIX included herein. The APPENDIX includes a glossary of terms and phrases which are used in discussing the present invention. For the purposes of the present invention, any common meanings associated with these terms and phrases are to be augmented by the meanings discussed in the APPENDIX.

The above and other advantages of the present invention are carried out in one form by a method of operating a computer. The computer has primary storage and a video display terminal, and the method causes the computer to visually express concepts using alternate forms of expression. In particular, the method calls for initiating execution of a computer program which operates in a plurality of modes and which produces concept data. The concept data formalize the concepts. The computer program then processes the concept data to produce expression data. The expression data is configured to control the video display terminal to symbolize the concepts. After initiating execution, the method loads, in the primary storage, a first data table which translates concept data into "first" expression data. In accordance with the method, user input is received while executing the computer program. This user input commands expression of said concept data in accordance with a predetermined expression mode. In response to the receipt of this user input, the method calls for overlaying the first data table with a second data table which is configured to translate the concept data into "second" expression data. The method continues execution of the computer program in its plurality of modes so that the video display terminal symbolizes the concepts in accordance with the predetermined expression mode identified by the user input.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE PREFERRED EMBODIMENT

Figure 1:
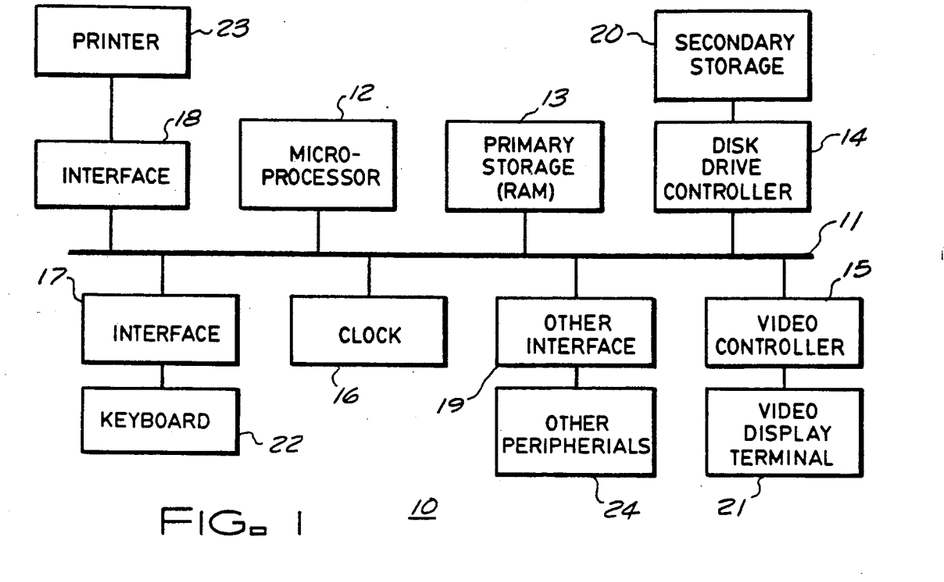
FIG. 1 shows a block diagram of a general purpose computer upon which the method of the present invention is practiced.

FIG. 1 shows a block diagram of a computer 10 with which the method of the present invention is practiced. Computer 10 represents a conventional general purpose computer. Thus, computer 10 includes an address, data, and control (ADC) bus 11 to which many devices couple. For example, a microprocessor 12, a primary storage or memory 13, a disk drive controller 14, a video controller 15, a clock 16, a keyboard interface 17, a printer interface 18, and other interfaces 19 all couple to ADC bus 11. A secondary storage or memory 20, such as a disk drive, couples to disk drive controller 14, a video display terminal 21 couples to video controller 15, a keyboard 22 couples to keyboard interface 17, a printer 23 couples to printer interface 18, and other peripherals 24 couple to their respective interfaces 19. In the preferred embodiment of the present invention, video controller 15 and VDT 21 are mutually configured to display color graphics, and printer 23 is configured to print or plot graphics in addition to linguistic information. Devices 11-24 cooperate with one another in a conventional fashion. In other words, microprocessor 12 executes programming instructions stored within primary storage 13, receives data from keyboard 22 and other peripherals 24, and outputs data to VDT 21 and printer 23.

Figure 2:
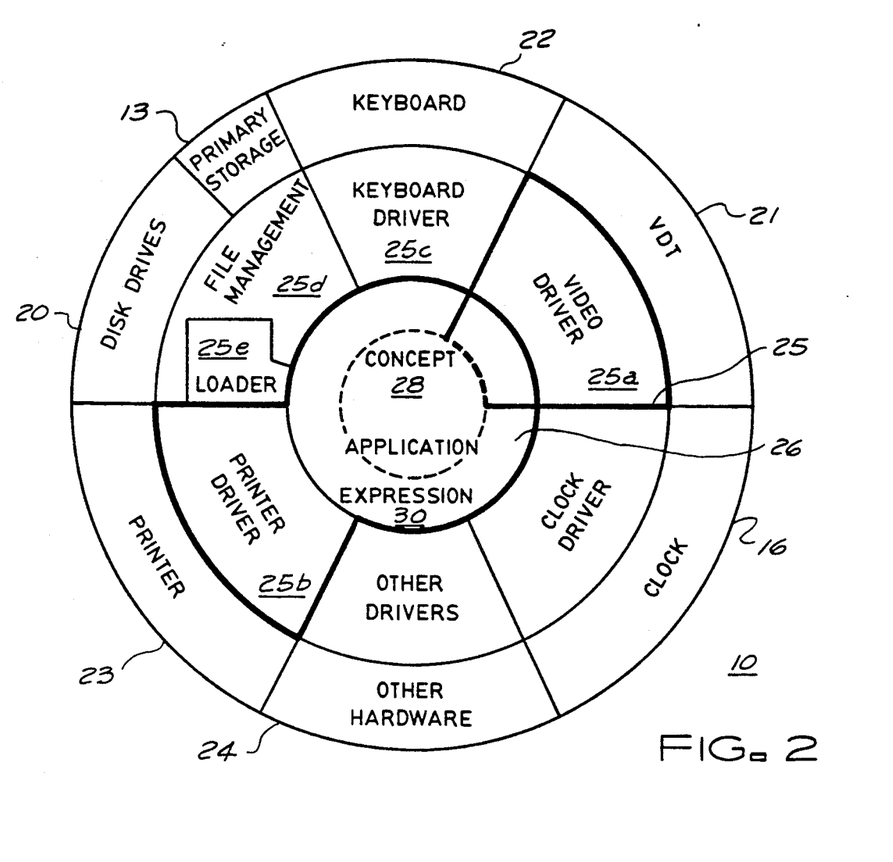
FIG. 2 illustrates relationships between computer hardware and various software components utilized in accordance with the method of the present invention.

FIG. 2 shows relationships between computer 10 and various software components utilized in accordance with the method of the present invention. The diagram of FIG. 2 includes three concentric rings. The above discussed devices 11-24 of computer 10 reside within the outer ring of FIG. 2. The middle ring represents an operating system 25. As is conventional, operating system 25 consists of software that controls the execution of application programs and that may provide scheduling, debugging, input/output control, accounting, compilation, storage assignment, data management, and related services for a user of computer 10 and for application programs. Preferably, operating system 25 is the well known software often referred to as DOS, MS/DOS, PC-DOS, or its equivalent. The present invention is primarily practiced by an application software package 26, which is represented by the inner circle of FIG. 2.

Software package 26 communicates with computer 10 through operating system 25. However, nothing prevents application software package 26 from providing some operating system features, such as a printer driver and a video driver. In particular, a video driver 25a is used to transfer data from software 26 to VDT 21, a printer driver 25b is used to transfer data from software 26 to printer 23, and a keyboard driver 25c is used to transfer data from a user of computer 10 at keyboard 22 into software 26. Likewise, file management section 25d of operating system 25 is used to transfer data between primary and secondary storage 13 and 20, respectively, for use by software 26. A file loader portion 25e of file management section 25d allows a user to cause at least an executable portion of software package 26 to be transferred from secondary storage 20 into primary storage 13 and to then transfer program control over to software 26.

The preferred embodiment of the present invention allows computer 10 to provide a wide variety of geographic information at VDT 21 and at printer 23. This geographic information is in the form of maps, displayed as graphic visual displays, and textual or linguistic information. The user may interactively select and-/or compose a visual display of geographic information. The user may then choose to print the selected visual display.

The preferred embodiment further allows the user to select various modes for expressing the geographic information at VDT 21, as discussed below. The selected mode of expression is then used in any printouts generated at printer 23. Accordingly, computer software 26 is divided into a concept component 28 and an expression component 30. Concept component 28 produces concept data (see APPENDIX), which is then transformed by expression component 30 into expression data (see APPENDIX) for output to VDT 21 and, if desired, printer 23.

Figure 3:
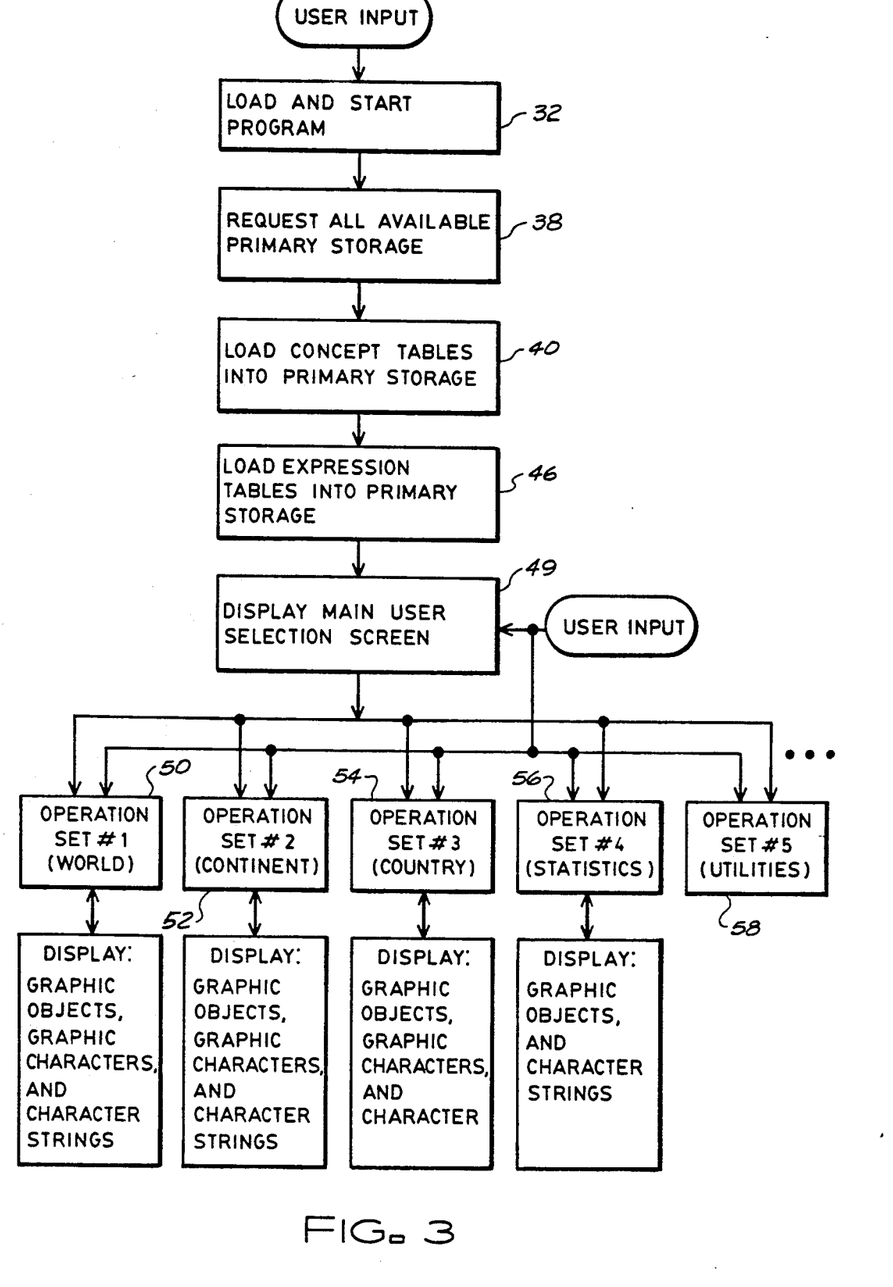
FIG. 3 shows a flow chart of the general operation of the method of the present invention.
Figure 4:
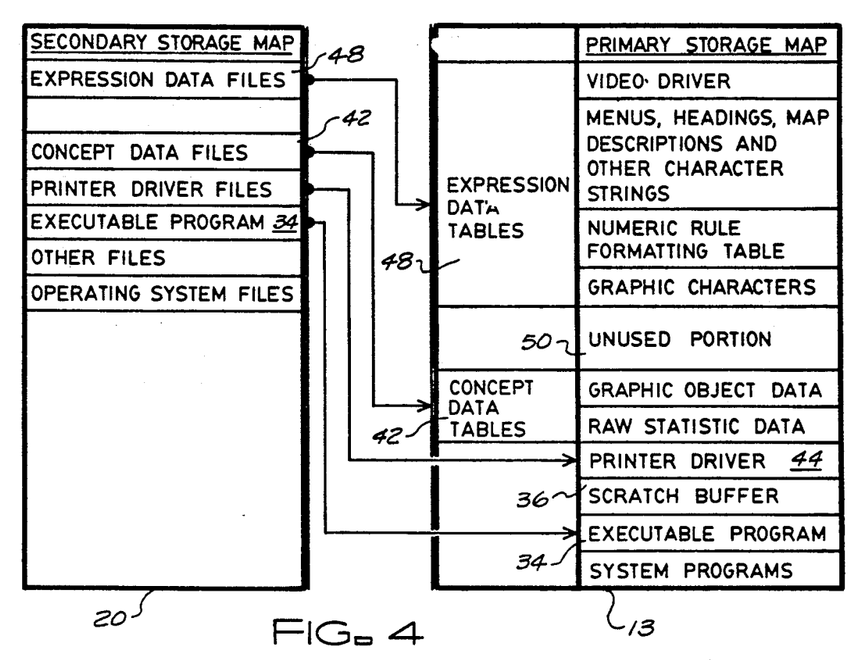
FIG. 4 shows a data diagram of data maintained in secondary and primary storage in accordance with the method of the present invention.

FIG. 3 shows a flow chart of the general operation of the method of the present invention. FIG. 4 shows a diagrammatic representation of data maintained in secondary storage 20 and in primary storage 13 in accordance with the method of the present invention. With reference to FIGS. 3 and 4, a user input causes operating system 25 (see FIG. 2) to perform a task 32. Task 32 causes a file containing an executable program 34 portion of application software 26 (see FIG. 2) to be read from secondary storage 20 and written into primary storage 13. Executable program 34 may be configured so that an additional scratch buffer 36 is reserved in primary storage 13 when executable program 34 is loaded. After program 34 is loaded, operating system 25 transfers program control to program 34.

Next, program 34 performs a task 38. Task 38 requests all available and unused memory space in primary storage for use by software 26. This request is accomplished by the transfer of appropriate commands to operating system 25. In response, operating system 25 lets program 34 know the total available memory space in primary memory 13.

Program 34 performs a task 40 after task 38. Task 40 loads concept data tables 42 and a printer driver 44 from secondary storage 20 into primary storage 13. Concept data tables 42 and printer driver 44 are placed immediately above program 34 and buffer 36 within primary storage 13. Generally speaking, concept tables 42 and printer driver 44 include permanent data. In other words, this data, like the data or programming instructions contained within program 34, do not change as a result of executing program 34.

After task 40, program 34 performs a task 46, which loads various expression data tables 48 from secondary storage 20 into primary storage 13. Expression data tables 48 are placed in the top portion of primary storage 13 in a top-down fashion. Thus, an unused portion 50 of primary storage 13 resides between concept data tables 42 and expression data tables 48. Expression data tables 48 generally include temporary data, which changes depending upon a mode in which software 26 is operating. The segregation of permanent and temporary data, with the loading of temporary data in a top-down fashion, permits the temporary data to be overlaid quickly, without the necessity of performing calculations and maintaining variables which identify current unused memory blocks.

At the completion of task 46, software 26 is prepared to perform the tasks it is designed to do, such as the presentation of geographic information. In particular, a task 49 presents a main user selection screen. In the preferred embodiment, this selection screen causes a graphic figure in the form of a world map to be displayed at VDT 21 along with discrete linguistic information items that identify "pull-down" menus. The user then interactively operates software 26 to alter the maps displayed at VDT 21, present statistical information, print screens, and perform other utilitarian functions. In other words, the main user selection screen allows user input to select one of a plurality of sets of operations or modes within which software 26 may thereafter operate.

From task 49, program flow proceeds to a user-selected one of procedures 50, 52, 54, 56, or 58. In the preferred embodiment, procedures 50, 52, and 54 perform sets of operations aimed at a world map, a continent map, or a country map, respectively. Procedure 56 performs a set of operations directed at providing statistical information related to a selected country, and procedure 58 allows a user to perform utilitarian functions related to the operation of software 26. These utilitarian functions include the changing of operational modes and the printing screens. As illustrated in FIG. 3, procedures 50-58 produce information which is presented at VDT 21. This information is configured so that a video display shown at VDT 21 includes one or more of graphic objects, graphic characters, and character strings (see APPENDIX).

Figure 5:
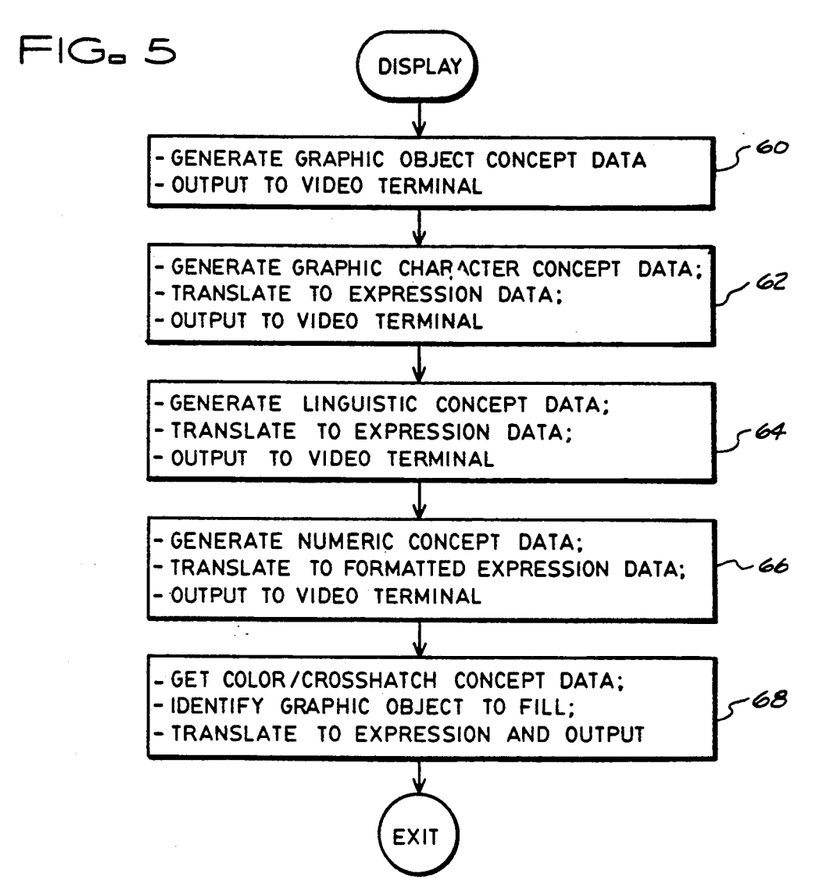
FIG. 5 shows a flow chart of tasks performed by the preferred embodiment of the method of the present invention to form a visual display.

FIG. 5 shows a block diagram of the tasks performed by software 26 in forming these visual displays. For the purposes of the method of the present invention, any one of operating sets 50-58 may be viewed as performing these tasks. The difference between the operating sets resides substantially in accessing different data for display. The specific maps, statistics, menus, and the like that the method of the present invention displays are not relevant to the specific invention. Those skilled in the art will appreciate that not all of operating sets 50-58 will need to perform all of the tasks shown in FIG. 5 in order to form a visual display for each screen, and that the precise order of tasks set forth in FIG. 5 need not be followed.

Figure 6:
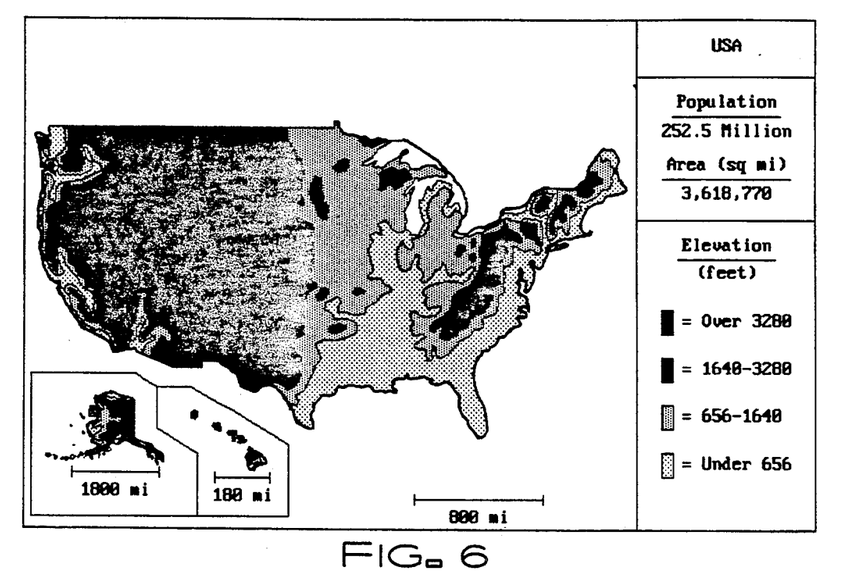
FIG. 6 shows a first example of a visual display produced by the preferred embodiment of the method of the present invention.

In forming and displaying visual displays, a task 60 first generates concept data (see APPENDIX) for graphic objects (see APPENDIX), then outputs this concept data to VDT 21. FIG. 6 shows a sample one of a multiplicity of visual displays producible by the preferred embodiment of the method of the present invention. In particular, FIG. 6 shows a map of elevations of the United States. The graphic object concept data instruct VDT 21 to form the border or perimeter of the United States, the borders of the Great Lakes, and the perimeters of the elevation isograms shown within the United States.

Figure 7:
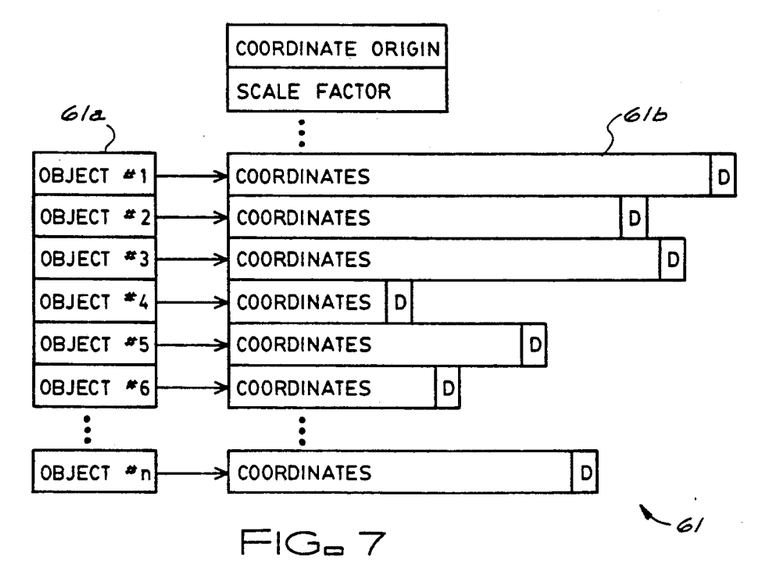
FIG. 7 shows a data diagram of a first table of concept data configured in accordance with the method of the preferred embodiment of the present invention.

FIG. 7 illustrates one technique for generating concept data for graphic objects using concept tables 42 (see FIG. 4). In particular, a graphic object concept table 61 may include the data items shown in FIG. 7. Software 26 (see FIG. 2) may first identify a particular graphic object to form in a visual display. That object may be determined automatically or in response to user input. The identification is preferably formatted as an index into a list of pointers 61a. The indexed pointer from list 61a identifies a particular list of coordinates from a data structure 61b. The specified list of coordinates specifies vectors that, when applied to a visual display, form the border of the selected graphic object. However, these vectors may first be processed in accordance with a coordinate origin offset and a scale factor before being applied to a visual display.

With reference back to FIG. 5, after task 60 a task 62 generates graphic character (see APPENDIX) concept data, translates the concept data into expression data, and outputs graphic character expression data to VDT 21. With reference back to FIG. 4, the concept data are generated through executable program 34 and concept data tables 42. The translation to expression data results from accessing expression data tables 48.

Figure 8:
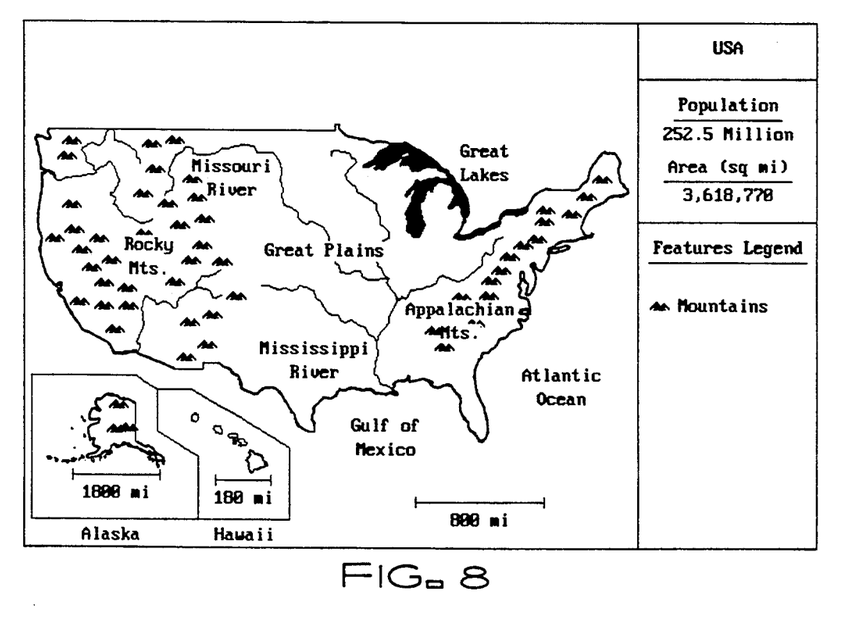
FIG. 8 shows a second example of a visual display produced by the preferred embodiment of the method of the present invention.

FIG. 8 shows another sample one of the multiplicity of visual displays producible by the preferred embodiment of the present invention. FIG. 8 shows a United States map which identifies and locates various features of the United States. These features, which are predominantly mountains, are indicated using graphic characters. As will be discussed in more detail below, these graphic characters are uniquely adapted for the black and white display depicted by FIG. 8. When the visual display depicted by FIG. 8 is shown in color at VDT 21, the shape of these graphic characters is different to optimize the visual effect when the information is presented in color. In particular, the mountain graphic character is generally smaller and shown in a solid color when presented in color.

The above-discussed graphic objects are preferably produced using a vector graphics technique. In contrast, graphic characters are typically much smaller and more consistently utilized. Thus, graphic characters may advantageously be formed utilizing raster graphic techniques. Thus, program 34 may specify a code that identifies the graphic character to output and its location, and a conventional character generation table may be used to translate the concept data into a specific expression of the concept.

Referring back to FIG. 5, after task 62, a task 64 generates linguistic information concept data, translates the concept data into expression data, and outputs the expression data to VDT 21. With reference back to FIG. 4, the concept data are generated through executable program 34. The translation to expression data results from accessing expression data tables 48. The alphabetic characters shown in FIGS. 6 and 8 represent the end result of such linguistic information. The concept data identify various strings. This identification generally results by specifying a variable, a table, an index to a table, or the like, and not data contained in the variables, tables, etc. In addition, the concept data indicate where to locate the linguistic information in the visual display and the area within the visual display that the linguistic information is permitted to occupy. The translation of concept data into expression data results from substituting identification of a variable, table, or index to a table for the data contained at the variable, table, or index.

After task 64, a task 66 generates numeric concept data, translates the concept data into formatted expression data, and outputs the formatted expression data to VDT 21. In the preferred embodiment of the present invention, the numbers shown in FIGS. 6 and 8, along with a multitude of additional numeric data, are stored in a binary form. Thus, this data is maintained in a compact form to conserve primary and secondary storage. These binary numbers, along with data identifying the area of the visual display they are to occupy, represent concept data.

Figure 9:
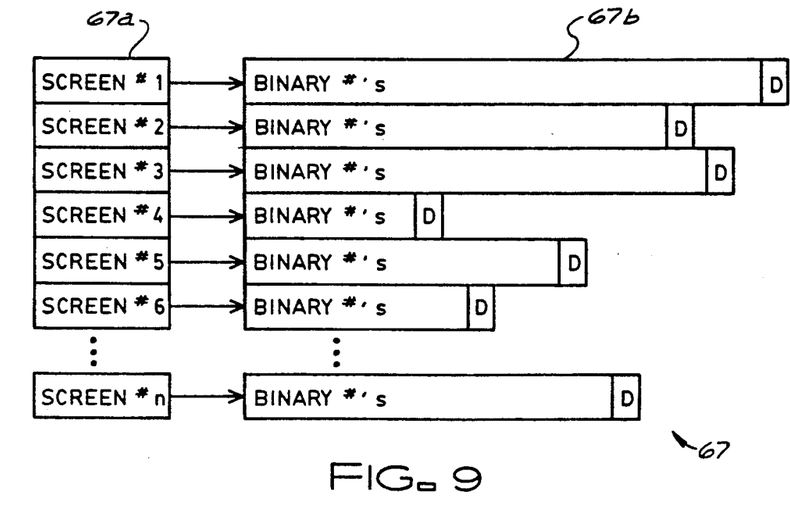
FIG. 9 shows a data diagram of a second table of concept data configured in accordance with the method of the preferred embodiment of the present invention.

As discussed above, these concept data are generated through executable program 34 and concept data tables 42 (see FIG. 4). For example, a data structure 67 illustrated in FIG. 9 may be used to generate numeric concept data. Program 34 may indicate that a particular screen is being displayed, then a list of pointers 67a identifies a set of binary numbers from a structure 67b which are applicable to that screen. They are translated into numeric characters using well known translation algorithms. The data is then formatted into expression data using formatting rules. Generally speaking, the formatting rules specify which character to use for a numerical separator, and other items which cause the expression of a number to be consistent with the style adopted for a particular language. The formatting rules are obtained by accessing expression tables 48 (see FIG. 4).

After task 66, a task 68 gets concept fill data, identifies a particular object for association with the fill data, and transforms the concept data into an expression of the fill data. In other words, task 68 causes an interior region of a particular graphic object to become filled in accordance with the identified fill data. This data may be automatically specified by the operation of software 26 (see FIG. 2) or may result from the receipt of user input, depending on the particular one of operation sets 50-58 (see FIG. 3) being performed and upon the particular operation being performed. Of course, task 68 may be repeatedly performed as necessary to fill multiple graphic objects. The concept fill data preferably specifies a particular fill pattern variable, without identifying the fill pattern itself. As discussed above, it is generated by operating executable program 34 (see FIG. 4). These data are translated into expression data by associating a particular color or crosshatching pattern with the specified fill pattern, then altering the visual display to fill the interior of the specified object. The translation results from accessing expression data tables 48 (see FIG. 4).

Figure 10:
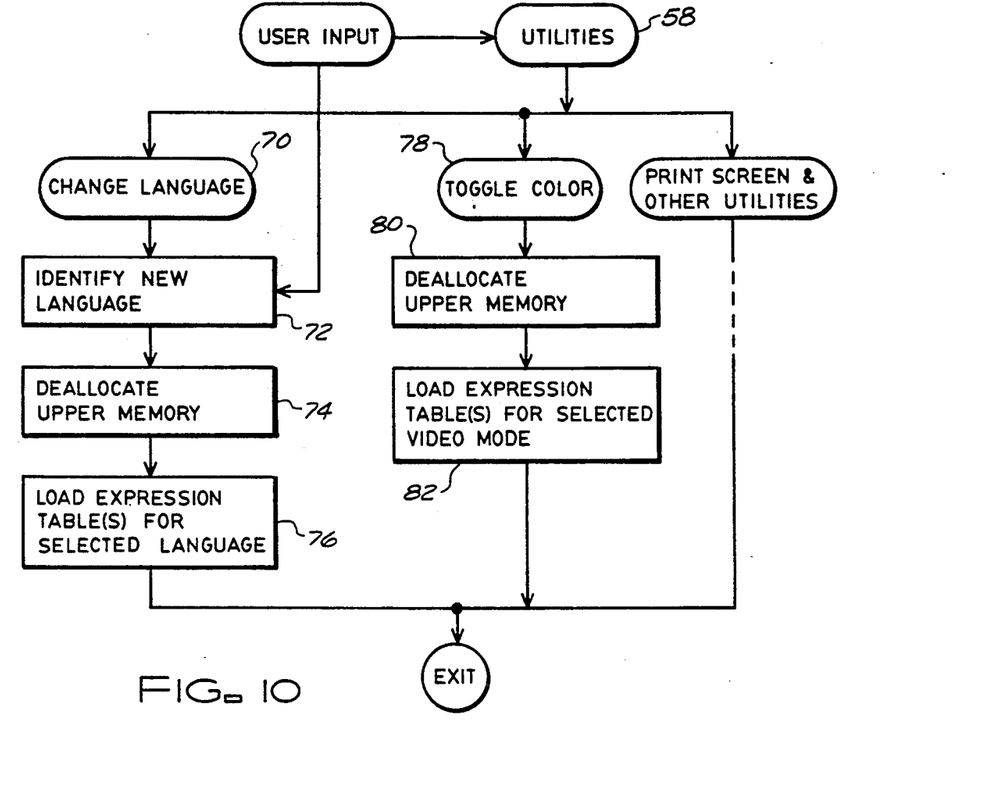
FIG. 10 shows a flow chart of tasks performed by the method of the preferred embodiment of the present invention to alter modes of expression.

FIG. 10 shows a flow chart depicting a portion of the tasks performed by the method of the preferred embodiment of the present invention during operation set 58 (see FIG. 3), which performs utilitarian functions. In particular, user input specifies which one of an assortment of various utilitarian functions to perform. One utilitarian function causes a current visual display to be printed. In this selection, well known algorithms are utilized to transfer the visual display to printer 23 (see FIGS. 1-2). When the current visual display is a color graphics display and printer 23 is a black and white printer, an automatic translation of colors into predetermined crosshatching patterns is performed before printing the visual display. However, this automatic translation may not achieve a desirable visual effect. For example, some adjacent graphic objects may be filled with nearly identical crosshatching. In this situation, the graphic objects are difficult to distinguish from each other. Moreover, various characters and graphic characters may be difficult to observe against a crosshatching background.

User input may cause operation set 58 to perform a change language procedure 70. A task 72 of procedure 70 requests the user to select a new language to use for expressing linguistic information. Preferably, a menu of available languages is displayed from which the user makes a choice.

After task 72, a task 74 deallocates the upper portion of primary storage 13 (see FIG. 4). In other words, task 74 sets a pointer which identifies a next available block of unused memory to the top of the available primary storage 13. Next, a task 76 reloads expression tables for the selected language. This reloading overlays the previously existing expression tables starting from the top of primary storage 13 and proceeding downward. After task 76, program control exits and a user is permitted to interactively perform any of program sets 50-58 in accordance with the new linguistic expression mode selected by procedure 70.

User input may also cause operation set 58 to perform a toggle color mode procedure 78. Color mode procedure 78 causes operation sets 50-58 to change from operating in a color mode to operating in a black and white mode, or vice-versa. While operating in the color mode, all visual displays shown at VDT 21 are presented in color, and all black and white printouts are made by automatically translating colors to predetermined crosshatching patterns. While operating in the black and white mode, all visual displays shown at VDT 21 are presented in black and white using crosshatching patterns to fill graphic objects. Moreover, while operating in the black and white mode, printouts are transferred directly from the visual display without any translation. Thus, a user may compose a visual display by specifying crosshatching patterns that achieve a desired visual effect and produce an easier-to-read printout.

Within procedure 78, a task 80 deallocates the upper portion of primary storage 13 (see FIG. 4). Next, a task 82 overlays the previous expression tables 48 within primary storage 13 (see FIG. 4) with new expression tables 48 that are consistent with the new color mode. After task 82, program control exits and a user is permitted to interactively perform any of program sets 50-58 in accordance with the new color expression mode set up through procedure 78.

Figure 11:
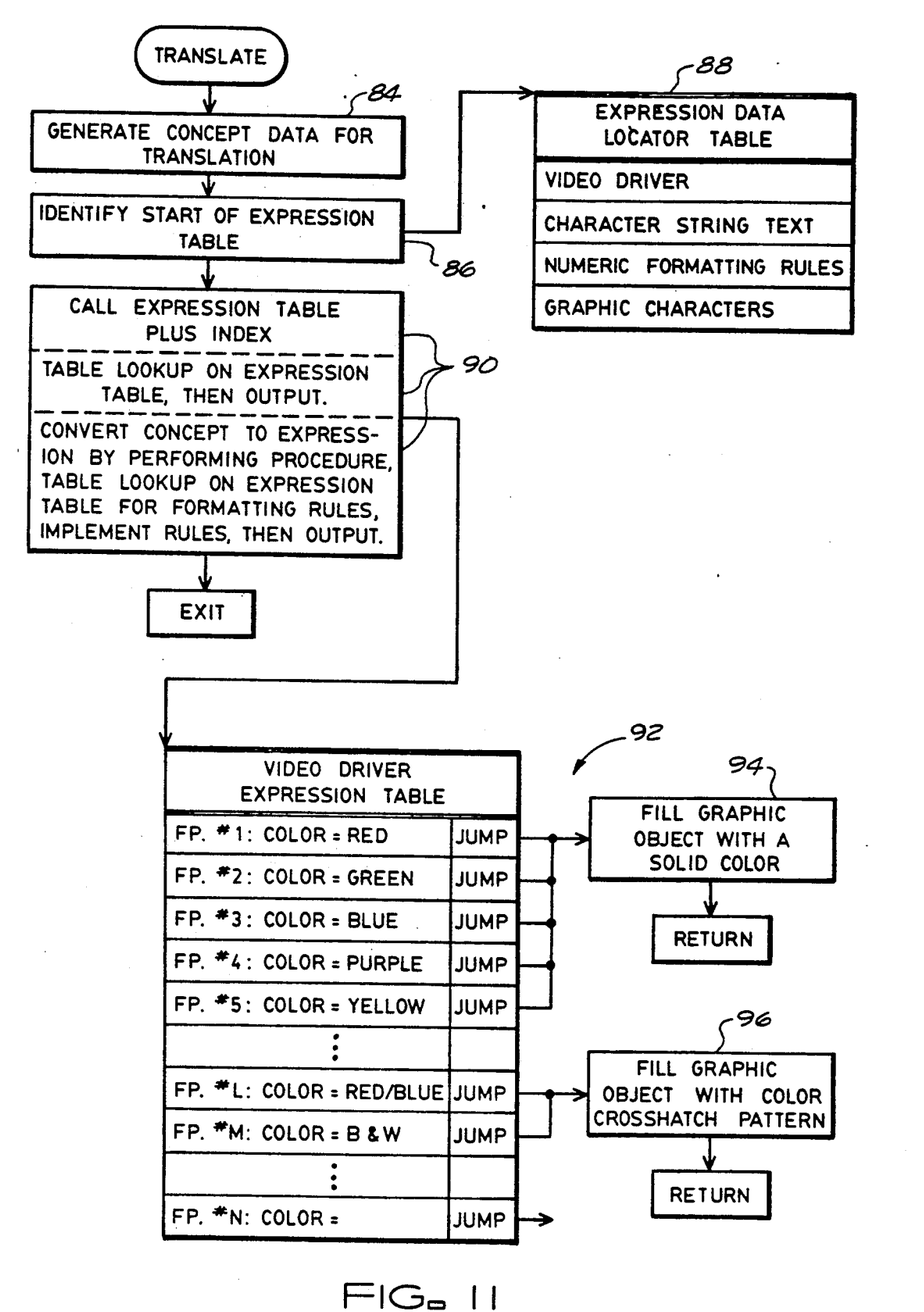
FIG. 11 shows a chart of tasks and data utilized to translate concept data into expression data in accordance with the method of the present invention.
Figure 12:
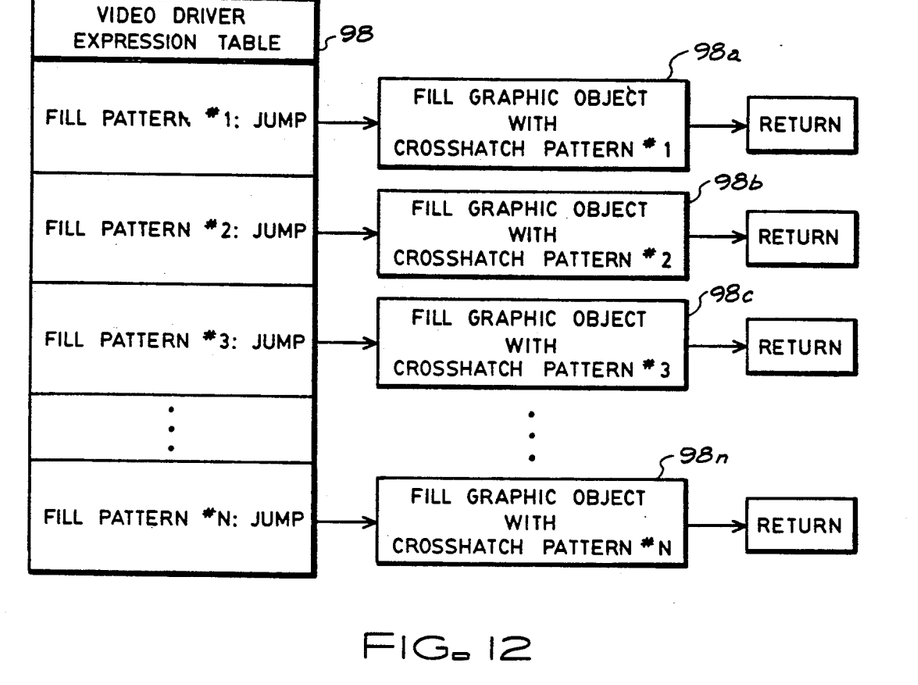
FIG. 12 shows a data diagram of a first table of expression data configured in accordance with the method of the preferred embodiment of the present invention.
Figure 13:
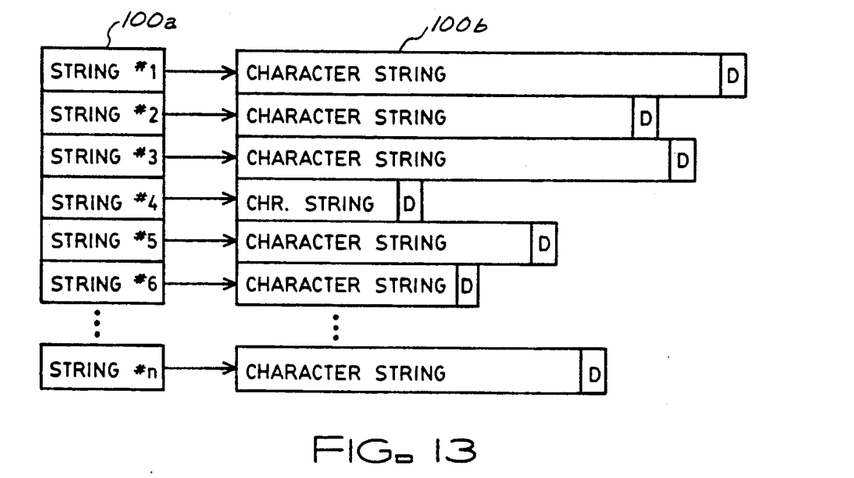
FIG. 13 shows a second table of expression data configured in accordance with the method of the preferred embodiment of the present invention.
Figure 14:
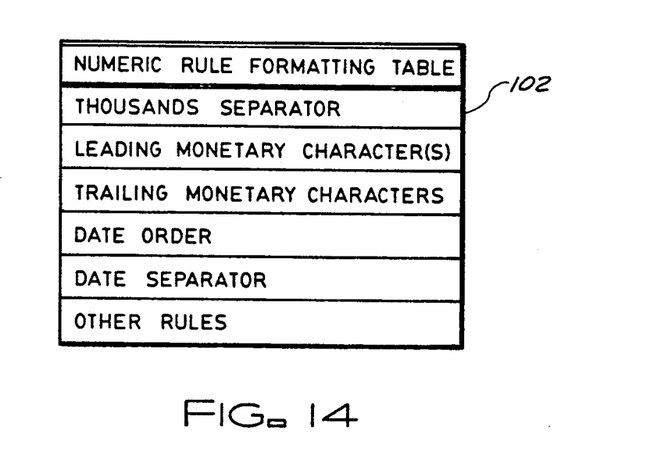
FIG. 14 shows a third table of expression data configured in accordance with the method of the preferred embodiment of the present invention.

FIG. 11, in conjunction with the data diagrams presented in FIGS. 12-14, illustrate various translations of concept data into expression data in accordance with the teaching of the method of the present invention. As shown at a task 84, software 26 (see FIG. 2) generates concept data as discussed above in connection with FIG. 5. Generally speaking, these concept data represent a formalization of a concept but do not signify any particular expression of the concept. As discussed above, linguistic information may be expressed in accordance with various languages, and graphic data may be expressed in accordance with a black and white mode or a color mode of presentation.

Next, a task 86 identifies the start of an appropriate expression table to use in translating the concept data into expression data. An expression data locator table 88 or simply various variables may be consulted to identify the beginning of a video driver expression table, a character string expression table, a numeric formatting rules table, or a graphic characters expression table. Of course, the table selected would be consistent with the type of translation to be performed. Table 88, or the variables which may substitute therefor, are updated when expression tables are loaded into primary storage 13 (see FIG. 4), as discussed above in connection with task 46 (see FIG. 3) and tasks 76 and 82 (see FIG. 10).

After task 86, a task 90 accesses the identified expression table. FIG. 11 illustrates an exemplary expression table 92 for use with a video driver in the color mode of presentation. Table 92 represents a jump table and related routines. Thus, concept data which identify a fill pattern represent an index into the beginning of table 92, and program control "calls" the address specified at the beginning of the table plus the index as a subroutine. Program control begins to execute instructions at the indicated location in table 92. Preferably these instructions set a variable to indicate a particular color. Next, these instructions transfer program control through a "jump" instruction to a routine 94 included in table 92. Routine 94 uses conventional algorithms to fill the interior of the indicated graphic object with the color indicated by the variable. After completion of routine 94, program control returns to the calling sequence, subsequent to task 90.

In some color modes, such as a well known CGA mode, the number of solid colors available for fill patterns is severely limited. Thus, table 92 may alternatively indicate a color combination to use in accordance with a routine 96. Routine 96 fills an indicated graphic object with a predetermined crosshatch pattern using the indicated color combination.

As discussed above, table 92 exemplifies an expression table which operates with a video driver in the color mode of presentation. In contrast, table 98, illustrated in FIG. 12, depicts an expression table suitable for use in operating the black and white expression mode. Table 98 also represents a jump table. However, routines 98a-98n, to which program control is routed from initial entry into jump table 98, operate to fill an indicated graphic object with a unique crosshatching pattern. For example, routine 98a may fill the graphic object with closely spaced lines that slant to the right. Routine 98b may fill the graphic object with closely spaced lines that slant to the left. Routine 98c may fill the graphic object with dots generally spaced a first distance apart, and so on. Thus, different ones of routines 98 may apply different patterns to the interior of the graphic object. Accordingly, tables 92 and 98 operate in a similar manner to express concept fill data using different forms of expression.

When task 90 (see FIG. 11) has concept data related to a character string, then an expression table similar to the one shown in FIG. 13 may suffice to translate the concept data into expression data. In this situation, the concept data include an item which identifies a string number. That number serves as an index into a pointer list 100a. The indicated pointer from pointer list 100a identifies the beginning of a particular character string of a data structure 100b. Task 90 may then simply output the characters found in the particular character string until a predetermined delimiter D is encountered. A unique table 100 may be constructed for each language and kept within secondary storage 20. However, only one of such tables 100 is maintained within primary storage 13 at any given time. Thus, the difference between English, Spanish, German, French, and other language versions of software 26 (see FIG. 2) is maintained by different expression tables 100.

When task 90 (see FIG. 11) has concept data related to a number, then an expression table similar to the one shown in FIG. 14 may suffice to translate the concept data into expression data. Specifically, binary data may be translated to a numeric character string using well known algorithms. A numeric rule formatting table 102 ma then be consulted to determine the proper formatting to apply to the numeric character string. Table 102 includes data items which indicate the numerical separator to use, the character(s) to use to specify a specific currency, such as "$", "DM", and the like, the placement of such monetary characters, the date form and separators, and similar formatting rules. Of course, a separate table 102 is constructed and maintained within secondary storage 20 for each language in which software 26 (see FIG. 2) may operate. However, only one of such tables 102 is maintained within primary storage 13 at any given time.

In summary, the present invention provides an improved method of operating a computer's video display terminal. The present invention provides for improved flexibility in the presentation of information because it separates concept data from expression data. Since this data is separated, expression tables serve as an efficient, concise translator for translating concept data into expression data. Alternate expression tables are constructed to translate given concepts into alternate forms for expressing the concepts. The expression tables do not include significant redundant data. Thus, the present invention conserves a computer's primary and secondary storage space while still allowing great flexibility in the presentation of information at the computer's video display terminal.

Furthermore, the user may quickly change expression modes. Expression mode changes are accomplished while executing application software by overlaying only small blocks of expression data. Only minor memory management overhead is involved since the temporary expression tables are separated from the more permanent application program data.

The alternate modes of expression are useful in many situations. In particular, alternate video display modes permit both color operation and black and white composition for printing. Alternate language modes permit nearly instant operation in accordance with a selected language, as is needed in multilingual environments. The alternate modes of expression are particularly valuable in presenting geographic information from a computer where both graphic and linguistic information are displayed.

The present invention has been described above with reference to a preferred embodiment. However, those skilled in the art will recognize that changes and modifications may be made in this preferred embodiment without departing from the scope of the present invention. For example, those skilled in the art may adapt the multiple modes of expression taught by the present invention for use in presenting types of information other than geographic information. In addition, those skilled in the art will recognize that a wide range of software programming structures may be employed to achieve the same results as are taught herein. Moreover, those skilled in the art may add additional features to adapt the teaching of the present invention to a particular general purpose computer. For example, those skilled in the art may further segregate the concept and expression data into near and far memory blocks in accordance with the memory addressing schemes of IBM-type personal computers. These and other changes and modifications which are obvious to those skilled in the art are intended to be included within the scope of the present invention.

APPENDIX

Black and white—a visual presentation of information using only two colors. The two colors may be black and white for high contrast. However, they may also be black and green, black and amber, or any other two color combination.

Binary number—a base 2 representation of a number stored or processed by computing equipment.

Character—any single symbol, digit, letter, or punctuation mark included in a character set and stored or processed by computing equipment.

Character set—the set of numbers, letters, punctuation marks, and symbols associated with a given device coding system and which are recognized by a computer. Examples of standard character sets include: ASCII, EBCDIC, and the IBM Extended Character Set.

Character string—a group of characters treated as a single data item.

Concept—an abstract idea generalized from particular instances. A concept which is to be visually expressed at a video display terminal is generalized from any particular form in which the concept may be expressed. For example, the concept related to the whole number of people or inhabitants in a country or region may be expressed in accordance with the English language as "population," in accordance with the Spanish language as "población," or in accordance with the German language as "bevölkerung."

Concept data—a formalized representation of a concept that may be expressed in diverse ways. In forming visual displays, concept data have meaning only within a computer program which forms the visual displays and are distinguishable from expression data.

Crosshatching—the shading of some portion of a graphic drawing with a pattern of dots, lines, or figures repeated across the area being shaded. Crosshatching is typically used to achieve a visual effect in which various regions of a graphic drawing are easily distinguished from one another by a human observer.

Data—a representation, formalized in bits, bytes, and/or words, of facts or concepts suitable for communication, interpretation, or processing by people or by automatic means.

Data structure—a collection of individual data items or data elements stored in a manner which reflects a relationship between them. Examples of data structures are: tables, arrays, records, lists, and linked lists.

Expression data—Data used to communicate a concept in accordance with a particular one of a possible plurality of modes of expression. Expression data are distinguished from concept data because concept data reflect no particular association with a particular mode of expression.

Formalize—to give a certain or definite form. For example, a concept represents an abstract idea, but concept data formalizes the concept by giving it a definite form represented as bits, bytes, or words of data.

Graphic characters—symbols or marks used in connection with graphic visual displays for much the same purposes for which characters are used. Graphic characters may include characters, but graphic characters need not be chosen from any particular character set. Graphic characters are typically formed from a collection of lines and may be distinguished from graphic objects because the shape of the collection of lines conveys information rather than the area covered by the lines.

Graphics data structure—a data structure arranged to describe shapes, lines, symbols, and colors expressed in a visual display.

Graphic object—a graphic figure having a perimeter surrounding any regular or irregular shape and enclosing or substantially enclosing an interior region. Graphic objects may be positioned adjacent to other graphic objects so that two adjacent graphic objects have a common border or perimeter. In this situation, interiors of the graphic objects are often filled with diverse colors or crosshatching patterns to distinguish one graphic object from another.

Linguistic information—words, letters, and numbers that express information. Linguistic information may be represented with characters and may be distinguished from graphics, which are shapes, lines and symbols. Linguistic information is also called text.

Mode—an operating state in which a computer program is placed by choosing among a set of exclusive operating options. Within a given mode, certain commands and operations are available, but in order to use other commands or operations modes may need to be changed.

Numeric character string—a character string composed of characters that represent numbers.

Palette—the whole set of colors currently available for display in a computer graphics system.

Program—a series of instructions that will cause a computer to process and/or produce data. It may be in a high-level source form, which requires intermediate processing before the computer can execute it, or it may be in an object/machine form directly executable by the computer.

Symbols—any member of the set of items which may be included in a visual display. Symbols include characters, graphic characters, and graphic objects. Information needs to be symbolized before it may be visually comprehended by a computer user.

Text—see linguistic information.

User input—data received from outside the computer, typically supplied by a computer user, and typically received from a keyboard, mouse, lightpen, or other input device.

User-selected—defined or chosen by the user of the computer system.

Visual display—a visual representation of data, such as a picture or diagram, drawn on a display screen or a diagram produced by a plotter or graphics printer.

What is claimed is:

1. A method of operating a computer having primary storage and a video display terminal, said method causing said computer to visually express concepts using alternate forms of expression, and said method comprising the steps of:
    initiating execution of a computer program which operates in a plurality of modes to produce concept data, said concept data formalizing said concepts, and which further processes said concept data to produce expression data, said expression data being arranged to control said video display terminal to symbolize said concepts;
    loading, in said primary storage, a first data table which translates said concept data into first expression data;
    receiving a user input, while executing said computer program, that commands expression of said concept data in accordance with a predetermined expression mode;
    overlaying, while executing said program, said first data table with a second data table, said second data table being configured to translate said concept data into second expression data; and
    continuing execution of said program in said plurality of modes so that said video display terminal symbolizes said concepts in accordance with said predetermined expression mode.

2. A method as claimed in claim 1 additionally comprising, after said initiating step, the step of loading, in said primary storage, a third data table which includes at least a portion of said concept data.

3. A method as claimed in claim 2 wherein:
    said initiating step comprises the step of loading said computer program into said primary storage;
    said method additionally comprises, prior to said loading steps, the step of determining remaining locations of said primary storage which are available for use by said computer program;
    said first table loading step loads said first data table in a first portion of said primary storage; and
    said third data table loading step loads said third data table in a second portion of said primary storage, said first portion of said primary storage residing farther from said computer program in said primary storage than said second portion of said primary storage.

4. A method as claimed in claim 3 wherein:
    said primary storage has upper and lower boundaries;
    said computer program and said third data table are loaded in said primary storage from a first primary storage address and extending toward a second one of said boundaries, said first primary storage address being located nearer to said first boundary than said second boundary; and
    said first data table is loaded in said primary storage starting from a second primary storage address and extending toward said first one of said boundaries, said second primary storage address being located nearer to said second boundary than said first boundary, so that an unused portion of said primary storage resides between said computer program and said first data table.

5. A method as claimed in claim 1 wherein:
    said video display terminal is a color graphics terminal;
    a portion of said expression data comprises a collection of graphic data structures describing graphic objects having interior regions;
    said graphic data structures of said first table are configured to form a visual display of said graphic objects using colors chosen from a palette having more than two diverse colors to fill said interior regions of said graphic objects; and
    said graphic data structures of said second table are configured to form a visual display of said graphic objects using crosshatching patterns chosen from a pattern set having more than two diverse crosshatching patterns to fill said interior regions of said graphic objects.

6. A method as claimed in claim 5 wherein a portion of said concept data describes positions where said graphic objects are to be located on said video display terminal and describes vectors which define borders of said graphic objects.

7. A method as claimed in claim 5 wherein a second portion of said expression data comprises a collection of graphic data structures describing graphic characters.

8. A method as claimed in claim 5 wherein said continuing step comprises the steps of:
receiving user input that commands said computer program to associate user-specified crosshatching patterns with user-specified ones of said graphic objects, thereby allowing a user of said computer to compose a visual display suitable for printing on a black and white printer;
printing said visual display on said printer.

9. A method as claimed in claim 1 wherein:
said expression data comprises a collection of character strings, any one of which, when displayed at said video display terminal, symbolizes linguistic information; in accordance with a first language; and
said character strings of said second table are configured in accordance with a second language.

10. A method as claimed in claim 9 wherein a portion of said concept data describes a position and area of said video display terminal within which said character strings are to be displayed.

11. A method as claimed in claim 10 wherein a portion of said concept data identifies specific character strings from said collection of character strings.

12. A method as claimed in claim 9 wherein:
a portion of said concept data represents binary numbers which are translated into numeric character strings so that they may be displayed on said video display terminal; and
a portion of said expression data identifies formatting rules to apply to said numeric character strings.

13. A method of operating a computer having primary storage, secondary storage, and a color graphics video display terminal, said method allowing a user of said computer to observe a color graphics presentation of visual displays and to compose said visual displays for printing on a black and white printer, and said method comprising the steps of:
loading a program from said secondary storage into said primary storage, said program causing said computer to perform a multiplicity of diverse interactive operations which cause a multiplicity of graphic objects having interior regions to be displayed at said terminal, and said program including computer instructions that define said interactive operations; initiating execution of said program;
first performing said operations so that said graphic objects are displaced using a selection of colors chosen from a group of more than two diverse colors to fill said interior regions of said objects;
receiving user input commanding operation of said computer in a black and white mode, said receiving step occurring while executing said program; and
second performing said interactive operation so that said graphic objects are displayed using diverse black and white crosshatching patterns to fill said interior regions of said objects.

14. A method as claimed in claim 13 wherein:
said first performing step comprises the step of accessing a first data table within said primary storage to translate concept data into first expression data;
said method additionally comprises, in response to said receiving step, the step of overlaying a second data table obtained from said secondary storage over said first data table in said primary storage; and
said second performing step comprises the step of accessing said second data table to translate said concept data into second expression data.

15. A method as claimed in claim 14 wherein a portion of said concept data describes positions where said graphic objects are to be located on said video display terminal and describes vectors which define borders of said graphic objects.

16. A method as claimed in claim 15 wherein a second portion of said first and second expression data comprises a collection of graphic data structures describing graphic characters.

17. A method as claimed in claim 16 wherein said second performing step comprises the steps of:
receiving user input that commands said computer program to associate user-specified crosshatching patterns with user-specified ones of said graphic objects; and
printing said user-composed visual display on said printer.

18. A method of operating a computer having primary storage, secondary storage, and a video display terminal, in a multilingual environment, said method comprising the steps of:
loading a computer program from said secondary memory into said primary memory, said computer program causing said computer to perform a multiplicity of diverse interactive operations which cause a multiplicity of linguistic information items to be displayed at said video terminal, and said program including computer instructions that define said interactive operations;
initiating execution of said computer program;
first performing said interactive operations so that said linguistic information items are displayed in accordance with a first language;
receiving user input commanding operation so said computer in a second language, said receiving step occurring while executing said program; and
second performing said operations so that said linguistic information items are displayed in accordance with said second language.

19. A method as claimed in claim 18 wherein:
said first performing step comprises the step of accessing a first data table within said primary storage to translate concept data into first expression data;
said method additionally comprises, in response to said receiving step, the step of overlaying a second data table obtained from said secondary storage over said first data table in said primary storage; and
said second performing step comprises the step of accessing said second data table to translate said concept data into second expression data.

20. A method as claimed in claim 19 wherein a first portion of said first and second expression data comprises a collection of character strings, any one of which, when displayed at said video display terminal, symbolizes linguistic information;
said character strings of said first table are configured in accordance with said first language; and
said character strings of said second table are configured in accordance with said second language.

21. A method as claimed in claim 20 wherein a first portion of said concept data describes a position and area of said video display terminal within which said character strings are to be displayed.

22. A method as claimed in claim 21 wherein a second portion of said concept data identifies specific character strings from said collection of character strings.

23. A method as claimed in claim 22 wherein:
a third portion of said concept data represents binary numbers which are translated into numeric character strings so that they may be displayed on said video display terminal; and
a second portion of said expression data identifies formatting rules to apply to said numeric character strings.

* * * * *

UNITED STATES PATENT AND TRADEMARK OFFICE
CERTIFICATE OF CORRECTION

PATENT NO. : 5,321,803

DATED : 14 June 1994

INVENTOR(S) : Donald J. Ditter, Jr.

It is certified that error appears in the above-identified patent and that said Letters Patent is hereby corrected as shown below:

Column 15, Line 17 (Claim 9) insert the phrase --said character strings of said first table are configured-- after "information;"

Column 15, Line 51 (Claim 13) replace "displaced" with --displayed--.

Column 16, Line 39 (Claim 18) replace "so" with --of--.

Signed and Sealed this

Thirtieth Day of August, 1994

Attest:

BRUCE LEHMAN

Attesting Officer

Commissioner of Patents and Trademarks